US005635922A

United States Patent [19]
Cho et al.

[11] Patent Number: 5,635,922
[45] Date of Patent: Jun. 3, 1997

[54] APPARATUS FOR AND METHOD OF PREVENTING CAR COLLISION UTILIZING LASER

[75] Inventors: Jung S. Cho; Young B. Im; Deog S. Cho, all of Kyoungki-do, Rep. of Korea

[73] Assignee: Hyundai Electronics Industries Co., Ltd., Rep. of Korea

[21] Appl. No.: 364,259

[22] Filed: Dec. 27, 1994

[30] Foreign Application Priority Data

Dec. 27, 1993 [KR] Rep. of Korea ................ 1993-29739
Dec. 27, 1993 [KR] Rep. of Korea ................ 1993-29753
Dec. 29, 1993 [KR] Rep. of Korea ................ 1993-30538

[51] Int. Cl.$^6$ ................................................. G08G 1/16
[52] U.S. Cl. .................... 340/903; 340/435; 180/169; 367/909; 342/70; 364/461
[58] Field of Search ........................... 340/903, 904, 340/435, 436; 180/169, 170, 271, 275; 367/909, 112, 107, 96, 97; 342/70, 71, 72; 364/460, 461, 426.04

[56] References Cited

U.S. PATENT DOCUMENTS

| 3,898,652 | 8/1975 | Rashid ................... 342/71 |
| 4,059,824 | 11/1977 | Tanimura . | |
| 4,641,136 | 2/1987 | Kowalczyk ................ 340/904 |
| 4,703,429 | 10/1987 | Sakata ...................... 342/70 |
| 5,189,619 | 2/1993 | Adachi et al. .............. 340/903 |

FOREIGN PATENT DOCUMENTS

| 5054298 | 3/1993 | Japan ................... 340/903 |
| 6103500 | 4/1994 | Japan ................... 340/903 |

*Primary Examiner*—Jeffery Hofsass
*Assistant Examiner*—Daniel J. Wu
*Attorney, Agent, or Firm*—Merchant, Gould, Smith, Edell, Welter & Schmidt

[57] ABSTRACT

An apparatus for and a method of preventing a car from coming into collision with an object car running ahead or behind, by monitoring car running conditions in the front and rear of the car by the provision of front and rear sensors to give an alarm to the front and rear object cars when an emergency situation has monitored, sensing a slope of a road surface on which the car runs to remove an error caused by an inclination of the car, sensing a handle rotation of the car to enable the car to follow the front object car on a curved road and to be informed of situations in the front and rear of the car on the curved road, establishing a sufficient safety distance, and sensing an emergency situation occurring in the rear of the car to inform a driver of the rear object car of the emergency situation by the provision of a display. When a rotation of the handle is detected, the front and rear sensors are rotated in a direction corresponding to that of the rotation of the handle by an amount corresponding to a rotation angle of the handle, while when a slope of a road surface on which the car runs is detected, the front and rear sensors are rotated in a direction reverse to that of the road surface slope by an amount corresponding to a gradient of the slope at a point of an estimated slope beginning time.

7 Claims, 5 Drawing Sheets

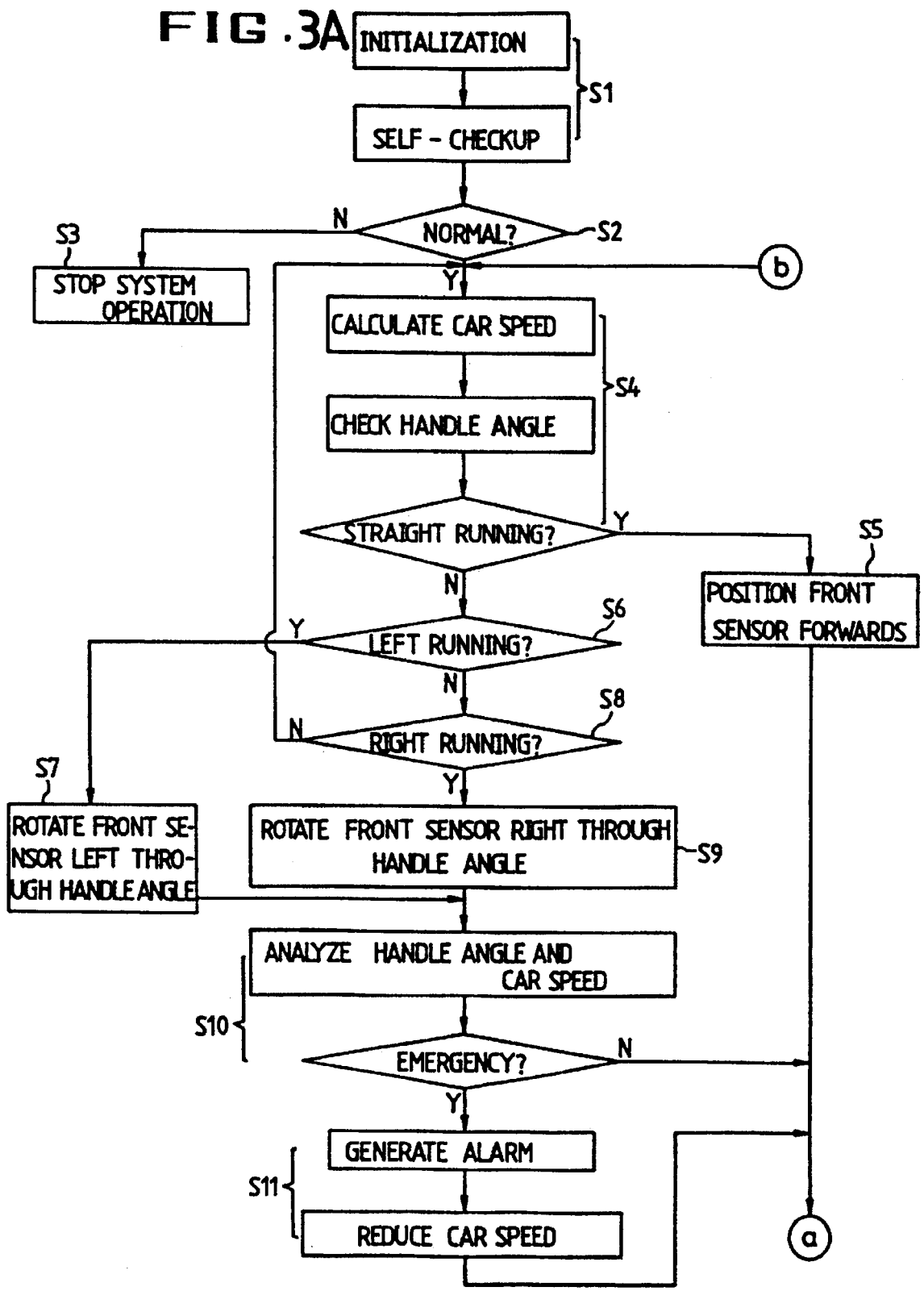

APPARATUS FOR AND METHOD OF PREVENTING CAR COLLISION UTILIZING LASER

BACKGROUND OF THE INVENTION

1. Field of the Invention

The present invention relates to an apparatus for and a method of preventing a car from coming into collision with an object car running ahead or behind by measuring a car-to-object distance utilizing a pulse laser, comparing data indicative of the measured car-to-object distance with reference data, and controlling a speed of the car and giving an alarm to a driver.

2. Description of the Prior Art

Generally, most existing car collision prevention systems are adapted to recognize a distance between a car and an object car running ahead or behind in a non-contact manner utilizing a light beam. When the car-to-object distance is not more than a predetermined safety distance, such a car collision prevention system performs an automatic braking of the car or gives an alarm to the driver to prevent a car accident.

In such a car collision prevention system, the safety distance is predetermined, taking into consideration various conditions such as the speed of the car, the speed of the object car, the car-to-object distance, the braking distance of the car, the response time of the driver, etc. The car collision prevention system analyses the above-mentioned conditions to recognize a point of time when the car-to-object distance is not more than the predetermined safety distance. Upon recognizing the car-to-object distance being not more than the predetermined safety distance, the car collision prevention system gives an alarm to the driver or brakes the car automatically.

In the case of such a conventional car collision prevention system, however, the safety distance predetermined as a reference value is based on data associated with a normal road condition. For this reason, an insufficient safety distance may be established when the car runs on a curved road or on a sloped road. In such a situation, the light beam reflected by the object may be irregular. In these cases, the car collision prevention system has difficulty in appropriately coping with the road condition. As a result, there is a problem that the accident prevention function of the conventional car collision prevention system is degraded.

SUMMARY OF THE INVENTION

Therefore, an object of the invention is to solve the above-mentioned problem encountered in the prior art and, thus, to provide an apparatus for and a method of preventing a car from coming into collision with an object car running ahead or behind, capable of monitoring car running conditions in the front and rear of the car to give an alarm to the front and rear object cars when an emergency situation is detected, sensing a slope of a road surface on which the car runs to remove an error caused by an inclination of the car, sensing a motion of a handle of the car to enable the car to follow the front object car on a curved road and to be informed of situations in the front and rear of the car on the curved road, establishing a sufficient safety distance to prevent an accident caused by the driver, and sensing an emergency situation occurring in the rear of the car to inform a driver of the rear object car of the emergency situation by means of a display and thereby to reduce generation of accidents caused by carelessness of the driver of the rear object car.

In accordance with the present invention, there is provided a car collision prevention apparatus which includes sensors respectively attached to a front surface, a rear surface and a bottom surface of a car and adapted to detect a distance and a relative speed between the car and each of object cars running ahead and behind, a running speed of the car and a road condition. If necessary, the car collision prevention apparatus includes a construction to inform a driver of the rear object car of various information by means of a display and thereby to prevent an emergency situation caused by the driver of the rear object car.

BRIEF DESCRIPTION OF THE DRAWINGS

Other objects and aspects of the invention will become apparent from the following description of embodiments with reference to the accompanying drawings in which:

FIGS. 3A and 3B are flow charts respectively illustrating a method of car collision prevention utilizing a handle angle detection carried out by the car collision prevention system of FIG. 1 in accordance with an embodiment of the present invention, wherein FIG. 3A shows a control based on a detected handle angle, while FIG. 3B shows a control based on a detected car-to-object distance.

DETAILED DESCRIPTION OF THE PREFERRED EMBODIMENTS

Figure 1:
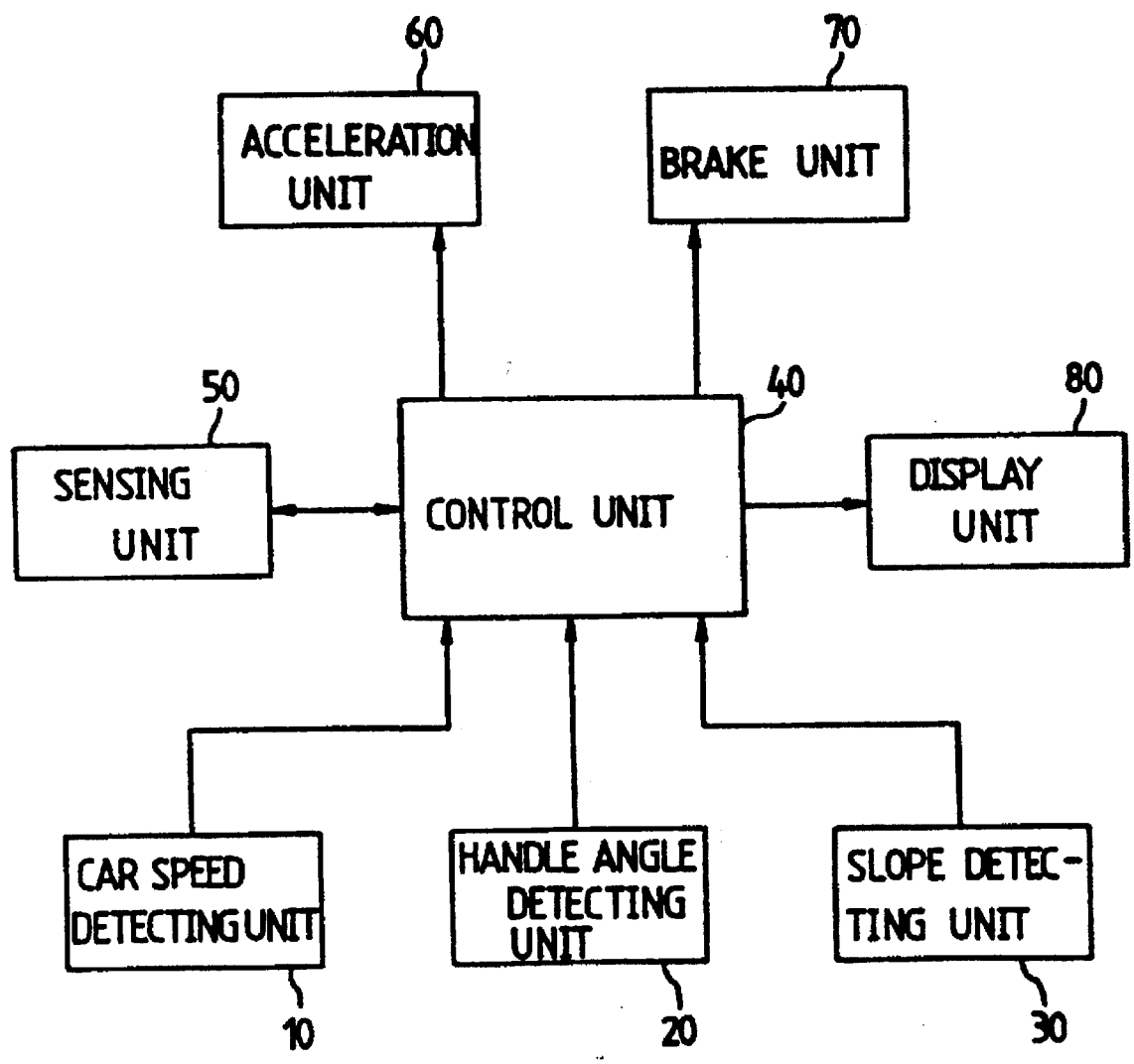
FIG. 1 is a block diagram illustrating a car collision prevention apparatus in accordance with the present invention.

Referring to FIG. 1, there is illustrated an apparatus for preventing a car collision utilizing a laser in accordance with the present invention. As shown in FIG. 1, the car collision prevention apparatus includes a car speed detecting unit 10 for detecting a speed of a car provided with the car collision prevention apparatus during the running of the car, a handle angle detecting unit 20 for detecting a rotation of a handle and generating a detection signal indicative of a rotation angle of the handle, a slope detecting unit 30 for detecting a road surface condition by use of a sensor mounted on a bottom surface of the car and generating a slope detection signal upon detecting a slope of the road surface, and a control unit 40 for receiving output signals from the car speed detecting unit 10, the handle angle detecting unit 20, and the slope detecting unit 30 and controlling the overall operation of the apparatus in response to the received signals. The car collision prevention apparatus also includes a sensing unit 50 for carrying out its sensing operation under a control of the control unit 40, an acceleration unit 60 for increasing the speed of the car under a control of the control unit 40, a brake unit 70 for automatically braking the car under a control of the control unit 40 when an emergency situation occurs, and a display unit 80 for displaying the emergency situation under a control of the control unit 40.

Figure 2:
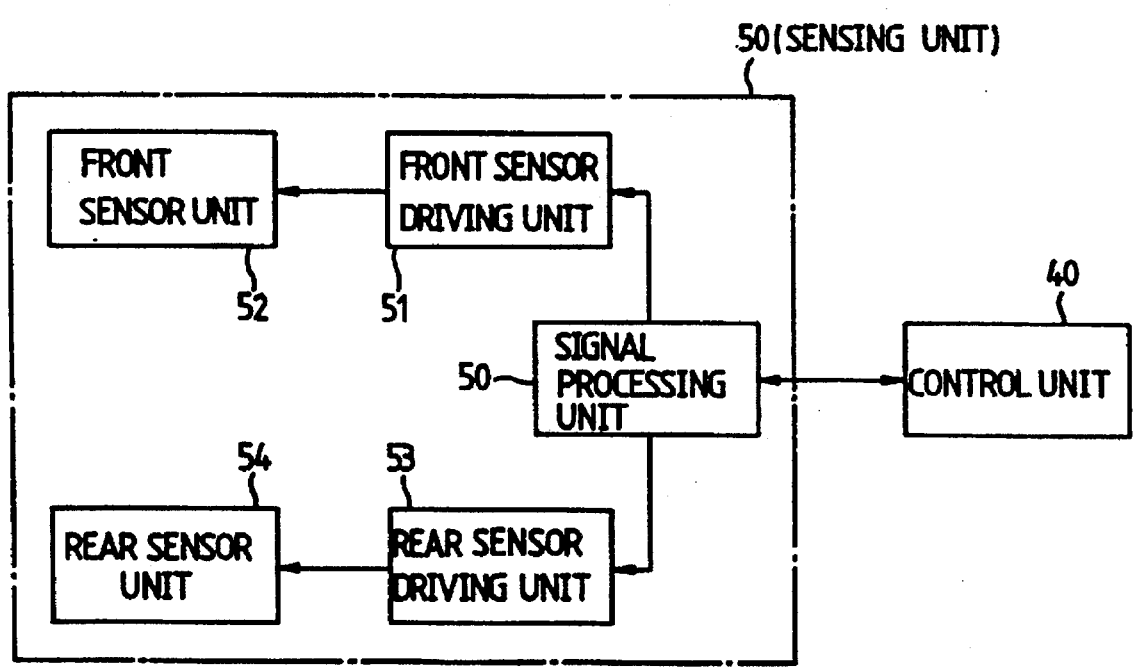
FIG. 2 is a block diagram illustrating a sensing unit constituting a part of the car collision prevention apparatus shown in FIG. 1.

As shown in FIG. 2, the sensing unit 50 includes a front sensor 52 adapted to monitor a situation in the front of the car and measure a distance between the car and an object car running ahead, a front sensor driving unit 51 adapted to rotate the front sensor 50 in a required direction, a rear sensor 54 adapted to monitor a situation in the rear of the car and measure a distance between the car and an object car running behind, a rear sensor driving unit 53 adapted to rotate the rear sensor 54 in a required direction, and a signal processing unit 50' adapted to receive a control signal generated from the control unit 40 in response to the vertical slope detection signal from the slope detecting unit 30 and to handle angle detection signal from the handle angle detecting unit, and processing the received signals to drive both the front sensor driving unit 51 and the rear sensor driving unit 53 so that both the front sensor 52 and the rear sensor 54 are rotated in a direction opposite to the direction of the road surface slope by an amount corresponding to the gradient of the slope at a point of an estimated slope beginning time and an amount corresponding to the rotation angle of the handle.

Operation of the car collision prevention apparatus in accordance with the present invention will now be described in detail.

When a handle rotates as the car turns during its running, the handle angle detecting unit 20 of the car collision prevention apparatus detects the rotation of handle and generates a signal indicative of the rotation angle of handle. The signal from the handle angle detecting unit 20 is sent to the control unit 40.

Upon receiving the output signal from the handle angle detecting unit 20, the control unit 40 determines the running direction of the car. If the control unit 40 determines the car to run in a straight direction, then it sends corresponding control signals to the signal processing unit 50' of the sensing unit 50, and then the signal processing unit 50' sends processed output signals to both the front sensor driving unit 51 and the rear sensor driving unit 53 so that the front sensor 52 and the rear sensor 54 are aligned with the longitudinal axis of the car. Under this condition, the front sensor 52 directs toward the front of the car while the rear sensor 54 directs toward the rear of the car.

If the control unit 40 determines the car to turn to the left, then it sends corresponding control signals to the signal processing unit 50' of the sensing unit 50, and then the signal processing unit 50' sends processed output signals to both the front sensor driving unit 51 and the rear sensor driving unit 53 so as to rotate both the front sensor 52 and the rear sensor 54 in a left direction in proportion to the rotation angle of the handle.

On the other hand, where the car turns to the right, the control unit 40 functions to rotate both the front sensor 52 and the rear sensor 54 in a right direction in proportion to the rotation angle of the handle.

Where a vertically sloping road surface is found in the front of the car during the running of the car, a slope sensor (not shown) of the slope detecting unit 30 operates to determine the gradient of the road surface slope. If the vertical slope of the road surface is found, a speed of the car is then detected. Based on the detected car speed, an estimated slope beginning time can be calculated. After deriving the gradient of the slope and the estimated slope beginning time, the signal processing unit 50' rotates the front sensor 52 and the rear sensor 54 in a direction reverse to the direction of the slope by a rotation angle corresponding to the derived slope gradient at the point of the estimated slope beginning time. At this time, the signal processing unit 50' utilizes motors (not shown) to rotate the sensors 52 and 54 vertically.

The signal processing unit 50' receives photoelectrically converted signals from the sensors 52 and 54 and sends them to the control unit 40. Upon receiving the signals from the sensors 52 and 54, the control unit 40 also receives data about the distance between the car and a forward object car and analyzes the data in comparison with the car speed to determine whether the car-to-object distance has reached an emergency distance. When the car-to-object distance has been determined to reach the emergency distance, the control unit 40 gives an alarm to the driver via the display unit 80 to inform the driver of the emergency situation. The control unit 40 also sends a brake signal to the brake unit 70 so as to reduce the car speed.

When a safety distance is established between the car and the forward object car again as the car speed is reduced, the emergency situation is released. When the car is spaced a predetermined distance apart from the forward object car, the control unit 40 sends an acceleration signal to the acceleration unit 60 so as to gradually increase the car speed.

In order to establish a sufficient safety distance, monitoring of the handle angle and comparison and analysis of the handle angle and the car speed are carried out. At a dangerous car speed, an automatic braking is also carried out. By these functions, an accident caused by an overspeed of the car on a curved road is prevented.

Meanwhile, each of the sensors 52 and 54 includes a light emitting element which may be constituted by a laser diode, a light emitting lens, and a *pulse driving circuit adapted to drive the laser diode with a high energy in a short time, and a light receiving element which may be constituted by a light receiving lens, an infrared filter, a photodiode and an electronic circuit adapted to photoelectrically convert a light received and amplify the resultant signal. The light receiving element serves as a person's eye.

As apparent from the above description, the car collision prevention apparatus enables a correct receipt of information desired by the driver about running conditions in the front and rear of the car on a curved road as well as on a straight road and prevents a failure of the car to follow the forward object car even under a condition that the road surface is irregular by detecting the rotation angle of the handle, changing the orientation of each sensor by a rotation of the sensor made depending on the curvature of the road determined on the basis of the detected handle angle, measuring a gradient of a road surface with a slope, and appropriately driving the sensors in a direction reverse to the direction of the slope on the basis of the measured gradient.

Figure 3B:
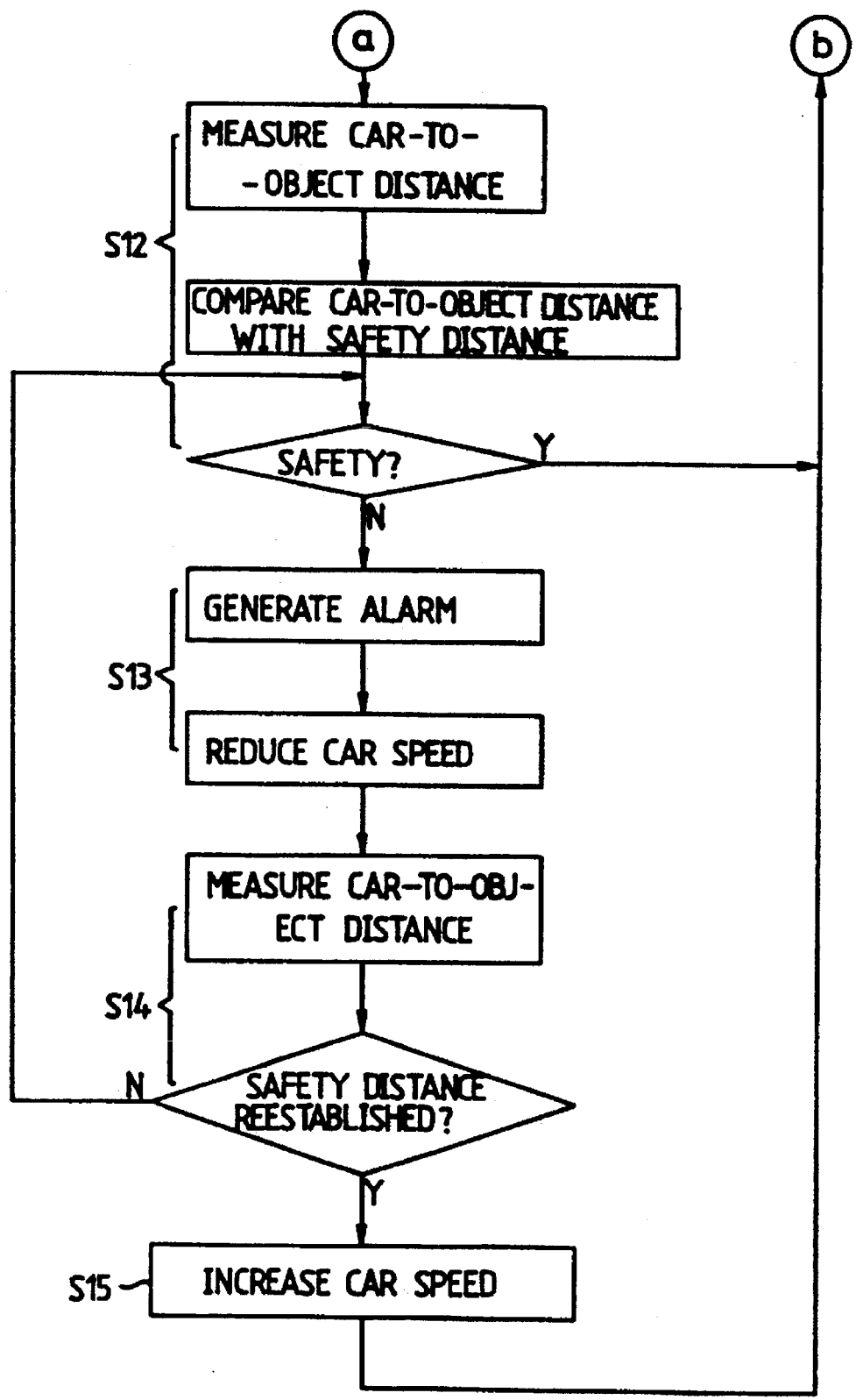

Referring to FIGS. 3A and 3B, there is illustrated a method of car collision prevention utilizing a handle angle detection carried out by the car collision prevention system of FIG. 1 in accordance with an embodiment of the present invention. In accordance with the method of the present invention, first, an initialization is carried out to initiate an operation of the car collision prevention system at a first step S1. After completing the initialization, a self checkup procedure is executed at the step S1. Based on the result of the self checkup, a determination is then made about whether the car collision prevention system operates normally, at a second step S2. Where the car collision prevention system has been determined to be abnormal at the step S2, information about the abnormal condition is reported at a third step S3. In this case, the system operation is stopped. Where the car collision prevention system has been determined to be normal at the step S2, the car speed is calculated at a fourth step S4. A check is also made at the step S4 about whether a rotation of the handle has been generated. Based on the result of the check at the step S4, a determination is also made about whether the running condition of the car corresponds to a straight running condition. When the running condition of the car corresponds to the straight running condition, the front sensor is positioned such that it directs toward the front of the car, at a fifth step S5. On the other hand, when the running condition of the car does not correspond to the straight running condition, a determination is also made at a sixth step S6 about whether the running condition of the car corresponds to a left turning condition. When the running condition of the car corresponds to the left turning condition, the front sensor is rotated left through an angle corresponding to the rotation angle of the handle, at a seventh step S7. When the running condition of the car has been determined at the step S6 not to correspond to the left turning condition, a determination is made at an eighth step S8 about whether the running condition of the car corresponds to a right turning condition. Where the running condition of the car does not correspond to the right turning condition, the procedure returns to the step S4 to calculate the car speed again. On the other hand, where the running condition of the car corresponds to the right turning condition, the front sensor is rotated right through an angle corresponding to the rotation angle of the handle, at a ninth step S9. Thereafter, an analysis of the handle angle in the right or left direction and the car speed is made at a tenth step S10. Based on the result of the analysis at the step S10, a determination is then made about whether the running condition of the car corresponds to an emergency running condition. If the running condition of the car corresponds to the emergency running condition, an alarm is then generated at an eleventh step S11. Simultaneously, a reduction in car speed is carried out at the step S11. Where the front sensor has been positioned at the step S5 such that it directs toward the front of the car, where the running condition of the car has been determined at the step S10 not to correspond to the emergency running condition, or when the running condition of the car corresponds to the emergency running condition no longer by the reduction in car speed carried out at the step S11, a distance between the car and a forward object car running in the front of the car is measured at a twelfth step S12. A determination is then made about whether the running condition of the car corresponds to a safe running condition, based on a comparison between the measured car-to-object distance and a predetermined safety distance. When the running condition of the car does not correspond to the safe running condition, an alarm is generated at a thirteenth step S13. Simultaneously, a reduction in car speed is carried out at the step S13. After completing the reduction in car speed at the step S13, the determination about the safety is made again at a fourteenth step S14. For this determination, the car-to-object distance is measured again. Based on the measured car-to-object distance, a determination is then made about whether the safety distance has been reestablished. If the safety distance has not been reestablished yet, the procedure returns to the step S12 to check about the safety again. When the safety distance has been reestablished, the car speed is increased at a fifteen step S15. After completing the acceleration, the procedure returns to the step S4 to calculate the car speed again.

Figure 4:
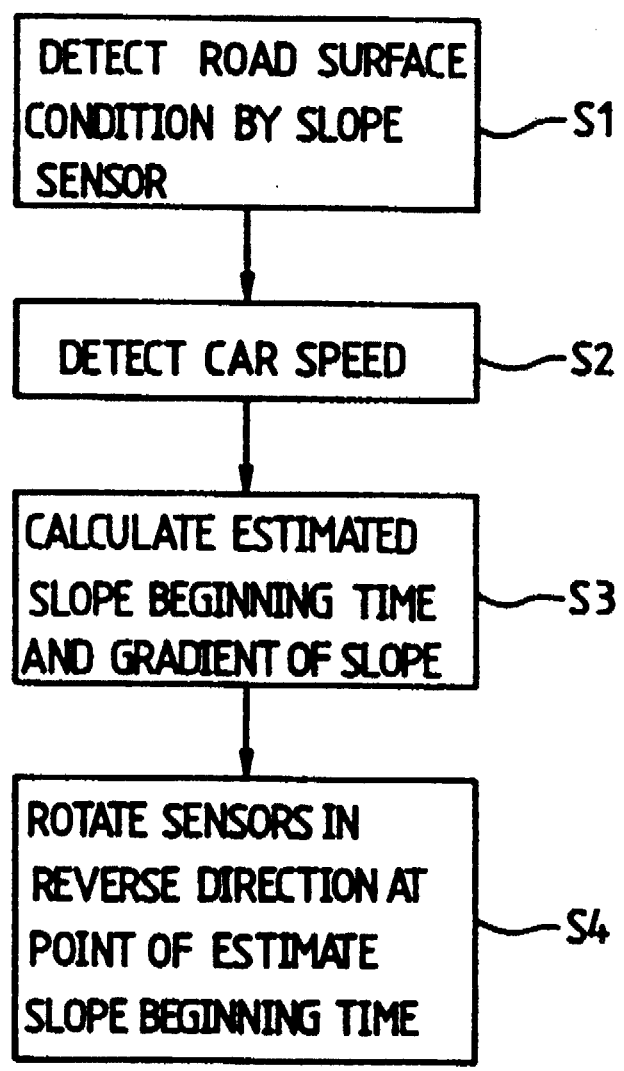
FIG. 4 is a flow chart illustrating a method of car collision prevention utilizing a slope detection carried out by the car collision prevention system of FIG. 1 in accordance with another embodiment of the present invention.

Referring to FIG. 4, there is illustrated a method of car collision prevention utilizing a slope detection carried out by the car collision prevention system of FIG. 1 in accordance with another embodiment of the present invention. In accordance with this method, first, a road surface condition is detected by the slope sensor at a first step S1. After completing the detection of the road surface condition, the car speed is detected at a second step S2. Based on the detected car speed, an estimated slope beginning time and a gradient of the slope are calculated at a third step S3. Finally, the sensors are driven in a direction reverse to the direction of the slope by an amount corresponding to the calculated slope gradient at the point of the estimated slope beginning time, at a fourth step S4.

As apparent from the above description, the present invention provides an apparatus for and a method of preventing a car from coming into collision with an object car running ahead or behind, capable of obtaining not only a function of preventing a danger such as a car collision on a straight road, but also a function of preventing an accident on a curved road by measuring a handle angle, and capable of obtaining a function of preventing an accident even under an irregular road surface condition by appropriately driving front and rear sensors on the basis of a slope detection achieved by a slope sensor to calculate a correct safety distance.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for preventing a first car from coming into collision with an object second car running ahead or behind, said first car having a bottom surface, said apparatus comprising:

a car speed detecting unit for detecting a speed of the first car and generating a car speed detection signal;

a handle angle detecting unit for detecting a rotation of a handle equipped in the first car and for generating a handle angle detection signal indicative of a rotation angle of the handle;

a slope detecting unit including a vertical slope detecting sensor for detecting a road surface gradient by use of said vertical slope detecting sensor mounted on the bottom surface of the first car and generating a slope detection signal upon detecting a vertical slope of the road surface;

a sensing unit, comprising a front sensor and a rear sensor, for sensing a position of the object second car in front of or behind the first car;

a control unit for receiving output signals from the car speed detecting unit, the handle angle detecting unit, and the slope detecting unit and for controlling operation of said apparatus in response to the received signals and for determining an occurrence of an emergency situation in response to the position of the object second car in front of or behind the first car;

an acceleration unit for increasing the speed of the first car under control of the control unit;

a brake unit for automatically braking the first car, under control of the control unit, when the emergency situation occurs; and a display unit for indicating the emergency situation under control of the control unit.

2. An apparatus in accordance with claim 1, wherein the sensing unit further comprises:

a front sensor driving unit adapted to rotate the front sensor in a required direction;

a rear sensor driving unit adapted to rotate the rear sensor in a required direction; and a signal processing unit adapted to receive control signals, the control signals generated by the control unit in response to the slope detection signal, and to process the received control signals for driving both the front sensor driving unit and the rear sensor driving unit so that both the front sensor and the rear sensor are rotated in a direction opposite to the direction of the road surface slope by an amount corresponding to a gradient of the slope at a point of an estimated slope beginning time.

3. An apparatus in accordance with claim 1, wherein the sensing unit further comprises:

a front sensor driving unit adapted to rotate the front sensor; and a rear sensor driving unit adapted to rotate the rear sensor;

wherein the front and rear sensor driving units receive control signals to rotate the front and rear sensors respectively, the control signals being generated by the control unit in response to the handle angle detection signal.

4. A method for preventing a first car from coming into collision with an object second car running ahead or behind, using a car-to-object distance measured by front and rear sensors utilizing a laser, comprising the steps of:

(A) when a rotation of a handle equipped in the first car is detected, rotating the front and rear sensors in a direction corresponding to a rotation direction of the handle by an amount corresponding to a rotation angle of the handle; and (B) when a slope of a road surface on which the first car runs is detected, deriving an estimated slope beginning time and rotating the front and rear sensors in a direction opposite to a road surface slope direction by an amount corresponding to a gradient of the slope at a point of the estimated slope beginning time.

5. A method in accordance with claim 4, wherein the step (A) comprises the steps of:

(a) initiating a car collision prevention system for executing a car collision prevention procedure, and executing a self checkup procedure;

(b) determining whether the car collision prevention system operates normally, based on the result of the self checkup procedure;

(c) when the car collision prevention system has been determined to be abnormal at the step (b), reporting the abnormal determination, and stopping operation of the car collision prevention system;

(d) when the car collision prevention system has been determined to be normal at the step (b), calculating a speed of the first car, checking whether the rotation of the handle has been generated, and then determining whether a current running condition of the first car corresponds to a straight running condition, based on the result of the check on the handle rotation;

(e) when the current running condition of the first car has been determined to correspond to the straight running condition at the step (d), positioning the front sensor such that it directs toward the front of the first car;

(f) when the current running condition of the first car has been determined not to correspond to the straight running condition at the step (d), determining whether the current running condition of the first car corresponds to a left turning condition;

(g) when the current running condition of the first car has been determined to correspond to the left turning condition at the step (f), rotating the front sensor left through an angle corresponding to the rotation angle of the handle;

(h) when the current running condition of the first car has been determined not to correspond to the left turning condition at the step (f), determining whether the current running condition of the first car corresponds to a right turning condition;

(i) when the current running condition of the first car has been determined not to correspond to the right turning condition at the step (h), returning the car collision prevention procedure to the step (d) to calculate the speed of the first car;

(j) when the current running condition of the first car has been determined to correspond to the right turning condition at the step (h), rotating the front sensor right through an angle corresponding to the rotation angle of the handle;

(k) analyzing the rotation angle of the handle in the right or left direction and the speed of the first car, and then determining whether the current running condition of the first car corresponds to an emergency running condition, based on the result of the analysis;

(l) when the current running condition of the first car has been determined to correspond to the emergency running condition at the step (k), generating an alarm and reducing the speed of the first car;

(m) when the front sensor has been positioned at the step (e) to direct towards the front of the first car, when the current running condition of the first car has been determined not to correspond to the emergency running condition at the step (j), or when the running condition of the first car no longer corresponds to the emergency running condition due to the reduction in the speed of the first car executed at the step (k), measuring a distance between the first car and the object second car running ahead or behind, and then determining whether the current running condition of the first car corresponds to a safe running condition, based on a comparison between the measured car-to-object distance and a predetermined safety distance;

(n) when the current running condition of the first car has been determined not to correspond to the safe running condition at the step (m), generating an alarm and reducing the speed of the first car;

(o) after completing the reduction in the speed of the first car at the step (n), measuring the car-to-object distance and determining whether the predetermined safety distance has been reestablished; and (p) when the predetermined safety distance has not been reestablished, returning the car collision prevention procedure to the safe running condition determining step of the step (m) to check safety, and increasing the speed of the first car and then returning the car collision prevention procedure to the step (d) to calculate the speed of the first car after re-establishing the predetermined safety distance.

6. A method in accordance with claim 4, wherein the step (B) comprises the steps of:

(a) detecting a road surface condition;

(b) detecting a speed of the first car; and (c) calculating the estimated slope beginning time and the gradient of the slope, based on the detected speed of the first car.

7. A method in accordance with claim 4, wherein the step (A) comprises the steps of:

detecting the rotation angle of the handle;

measuring a speed of the first car;

calculating whether the first car is in an emergency condition, the calculation being based on the detected rotation angle, the measured speed and the measured car-to-object distance.

* * * * *